United States Patent [19]
Winks et al.

[11] Patent Number: 5,829,566
[45] Date of Patent: Nov. 3, 1998

[54] CLUTCH PACK WITH DOUBLE-SIDED CLUTCH PLATES

[75] Inventors: Joseph A. Winks, West Monroe; Bradley T. Fox, Syracuse, both of N.Y.

[73] Assignee: New Venture Gear, Inc., Troy, Mich.

[21] Appl. No.: 840,565

[22] Filed: Apr. 21, 1997

Related U.S. Application Data

[63] Continuation of Ser. No. 543,414, Oct. 16, 1995, abandoned.

[51] Int. Cl.$^6$ .................................................. F16D 13/72
[52] U.S. Cl. ................................... 192/70.12; 192/70.14; 192/113.2
[58] Field of Search ............................ 192/70.11, 70.12, 192/70.14, 70.16, 70.19, 70.2, 70.23, 70.24, 70.28, 70.29, 70.3, 85 AA, 85 C, 99 A, 99 S, 113.1, 113.2, 113.21

[56] References Cited

U.S. PATENT DOCUMENTS

| | | | |
|---|---|---|---|
| 1,886,865 | 11/1932 | Bixby | 192/113.2 |
| 2,201,567 | 5/1940 | Walters | 192/70.12 |
| 4,042,085 | 8/1977 | Bjerk et al. | 192/70.14 X |
| 5,029,686 | 7/1991 | Yesnik | 192/70.14 |
| 5,148,900 | 9/1992 | Mohan . | |
| 5,226,517 | 7/1993 | Grochowski | 192/85 AA |
| 5,323,871 | 6/1994 | Wilson et al. . | |
| 5,330,030 | 7/1994 | Eastman et al. . | |
| 5,332,060 | 7/1994 | Sperduti et al. . | |
| 5,346,044 | 9/1994 | Mohan et al. . | |
| 5,398,793 | 3/1995 | Stephens et al. . | |
| 5,535,870 | 7/1996 | Takezaki et al. | 192/70.14 |

FOREIGN PATENT DOCUMENTS

| | | | |
|---|---|---|---|
| 496979 | 8/1992 | European Pat. Off. | 192/70.14 |
| 3326409 | 3/1984 | Germany | 192/70.14 |
| 2-17233 | 1/1990 | Japan | 192/113.1 |
| 4-107324 | 4/1992 | Japan | 192/70.2 |
| 5-288227 | 11/1993 | Japan | 192/85 AA |

*Primary Examiner*—Richard M. Lorence
*Attorney, Agent, or Firm*—Harness, Dickey & Pierce, P.L.C.

[57] ABSTRACT

The present invention provides a clutch assembly operative to transmit forces between an input and an output and includes a first set of plates connected to the input and a second set of plates connected to the output. The first and second plates are alternately interleaved to form a clutch pack and friction material is disposed on both sides of each of the second plates. An engagement mechanism is coupled for rotation with the input and is operable for applying a compressive force to the interleaved clutch pack thereby creating friction forces that transfer forces between the input and the output. By placing the friction material on both sides of the second clutch plates rather than the first clutch plates, the improvement provides for greater torque transfer efficiency and heat dissipation over existing clutch assemblies.

4 Claims, 1 Drawing Sheet

CLUTCH PACK WITH DOUBLE-SIDED CLUTCH PLATES

This is a continuation of U.S. patent application Ser. No. 08/543,414 filed Oct. 16, 1995 now abandoned.

BACKGROUND OF THE INVENTION

The present invention relates generally to a clutch assembly for transmitting forces from a driven member to a non-driven member. More particularly, the invention discloses a multi-disk clutch pack including two sets of alternately interleaved clutch plates operative to frictionally transmit torque or create a viscous coupling between a rotationally driven member and a non-driven member.

Power transfer systems commonly include a clutch assembly having two sets of alternately interleaved friction clutch plates operable to transmit drive torque or other forces to a non-driven member. Reference may be had to commonly owned U.S. Pat. No. 5,411,110 for a description of an exemplary power transfer system disposed in a four-wheel drive transfer case.

Prior clutch assemblies used to transfer torque, such as that disclosed in U.S. Pat. No. 5,411,110, generally include a clutch pack formed of alternately interleaved inner and outer clutch plates with a friction material bonded to one or both sides of each inner plate. While existing assemblies are generally effective at transferring torque, a continuing need exists to increase the efficiency and decrease the cost of clutch assemblies in power transfer systems. Further, a need also exists for a clutch assembly that more efficiently dissipates the heat generated by the frictional engagement of the clutch plates.

SUMMARY OF THE INVENTION

It is therefore an object of the present invention to provide a clutch assembly having improved power transfer capabilities and that, for a predetermined force transfer, is smaller in size than existing clutch assemblies.

It is an additional object of the present invention to provide a clutch assembly for use in a power transfer system that more effectively dissipates the heat generated by the frictional engagement of adjacent alternately interleaved clutch plates.

According to a preferred embodiment of the invention, the improved clutch assembly includes a set of separator plates extending from a driven member and which are disposed in alternately interleaved engagement with a set of clutch plates connected to a non-driven member, thereby forming a clutch pack. The improved clutch assembly includes friction material disposed on both sides of each clutch plate. The clutch assembly is further provided with means for compressing the alternately interleaved separator and clutch plates so that the clutch assembly is operative to transfer torque or create a viscous coupling between the driven member and the non-driven member.

BRIEF DESCRIPTION OF THE DRAWINGS

Further objects, features and advantages of the present invention will become apparent to those skilled in the art from a reading of the following description in conjunction with the accompanying drawings, in which.

DETAILED DESCRIPTION OF THE PREFERRED EMBODIMENTS

Figure 1:
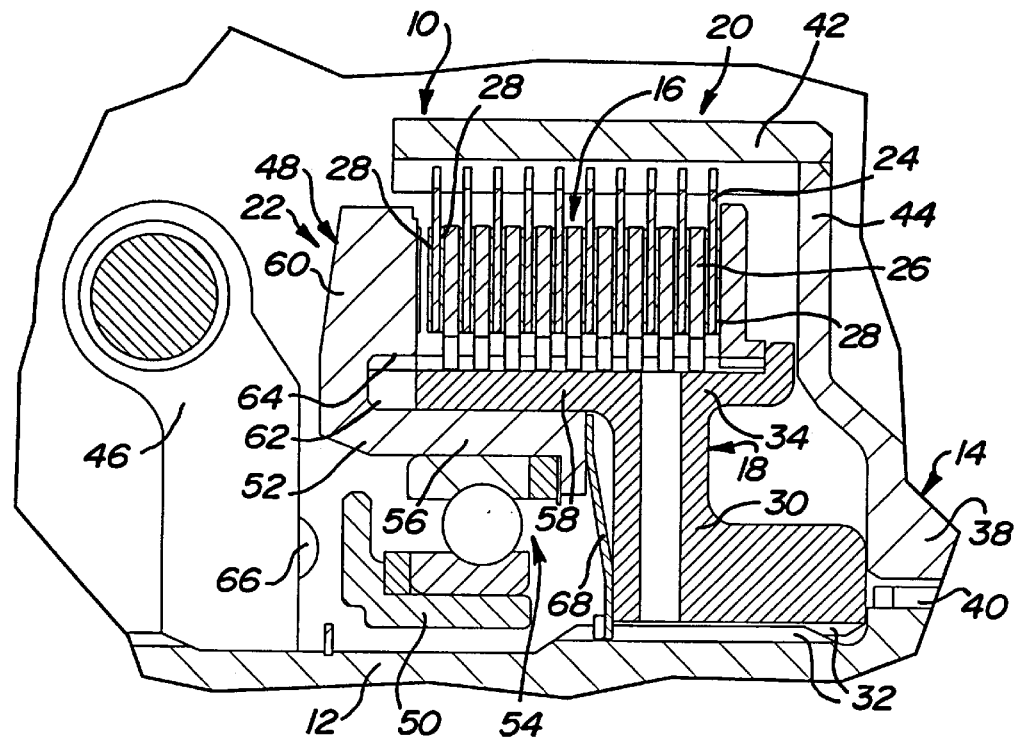
FIG. 1 is a partial sectional view of a power transfer system having a clutch assembly in accordance with the present invention that is used to transfer torque from an input shaft to an output.

In general, the present invention is directed to a clutch assembly having two sets of alternately interleaved clutch plates wherein one set of plates has friction material mounted on both sides thereof and the other set of plates function as separators and heat dissipators for the clutch assembly. The clutch assembly as hereinafter described may be used as a power transfer system in a multiplicity of environments including transferring torque from an input shaft to an output. FIG. 1 shows the improved clutch apparatus disposed in a power transfer system for a four-wheel drive vehicle such as that disclosed in U.S. Pat. No. 5,411,110 to Wilson et al., the disclosure of which is incorporated herein by reference. While the clutch apparatus shown in FIG. 1 may be specifically adapted for use in the Wilson power transfer system, it will be appreciated that the interleaved relationship of double sided clutch plates and separator plates as discussed herein is equally applicable in other power transfer environments including both rotational and linear force systems.

With particular reference to FIG. 1 of the drawings, there is shown a clutch apparatus 10 adapted to transfer torque between an input and an output. As will be discussed in greater detail hereinafter, clutch apparatus 10 includes two sets of plates interleaved to form a clutch pack 16, a mounting structure 18 for connecting a first set of plates to an input shaft 12, a mounting structure 20 for connecting a second set of plates to an output 14 and engagement means 22 for applying a compressive force to clutch pack 16.

In the embodiment shown in FIG. 1, clutch pack 16 is formed by the alternately interleaved arrangement of outer clutch plates 24 and inner separator plates 26. Outer clutch plates 24 are shown in FIG. 1 to have a layer of a friction material 28 mounted on both sides thereof while inner separator plates 26, connected to input shaft 12, operate as separators and heat dissipators. Inner separator plates 26 may be provided with fine splines (not shown) to yield a greater contact area for heat dissipation to input 12. Further, in the preferred embodiment, inner separator plates 26 are shown to be approximately twice the thickness of outer clutch plates 24 thereby increasing the efficiency of heat transfer toward input 12. It is preferred that the layer of friction material 28 be comprised of a paper or Kevlar based material known in the art. However, any material capable of providing suitable wear and force transfer characteristics may be bonded to outer clutch plates 24 and be within the contemplated scope of equivalent materials.

Inner and outer plates 24, 26 may be mounted directly to input 12 and output 14, respectively, or may be connected thereto by a variety of mounting structures. In FIG. 1, an input plate mounting structure 18 is shown to include an annular hub 30 connected for rotation with input shaft 12 via splines 32. A cylindrical drum 34 connects inner plates 26 to annular hub 30. Similarly, outer plate mounting structure 20 includes a tubular output extension 38 disposed on appropriate bearing assemblies 40 for rotation relative to input shaft 12. Cylindrical drum 42 connects outer plates 24 for rotation with output 14 through cover plate 44. As a result of the interleaved engagement of clutch plates 24 and separator plates 26, the relative rotation of input shaft 12 and output 14 is governed by the relative rotation of inner separator plates 26 with respect to outer clutch plates 24.

Clutch apparatus 10 is shown to include engagement means 22 for compressing clutch pack 16 and generating frictional forces between outer clutch plates 24 and inner separator plates 26 whereby torque is transferred from input shaft 12 to output 14. It will be appreciated that the amount of torque transferred from input shaft 12 to output 14 is proportional to the compressive force exerted by engagement means 22. Engagement means 22 includes a pivotably moveable lever arm assembly 46 cooperating with a thrust mechanism 48 to compress clutch pack 16 in response to controlled pivoting movement of lever arm assembly 46. Thrust mechanism 48 includes an inner bearing support 50 journally supported on input 12, an outer bearing support 52 coupled for rotation with input 12, and a thrust bearing assembly 54 mounted between inner bearing support 50 and outer bearing support 52. While not shown, lugs extending from inner bearing support 50 are rested in corresponding apertures in lever arm 46 for inhibiting rotation of inner bearing support 50 relative to input 12. Outer bearing support 52 is mounted for rotation with and axial sliding movement on hub 30. In particular, outer bearing support 52 includes a tubular segment 56 supported for sliding movement relative to an axial flange segment 58 of hub 30, and a radial segment 60 which acts as an apply plate for frictionally compressing the interleaved plates. Lugs 62 extending from axial flange segment 58 are nested within apertures 64 in radial segment 60 for coupling outer bearing support 52 to hub 30 for common rotation. Buttons 66 on lever arm assembly 46 are engageable with inner bearing support 50 for causing sliding movement of the entire thrust mechanism 48 in response to pivotable movement of lever arm assembly 46. Finally, a return spring 68 is retained between hub 30 and outer bearing support 52 for normally biasing sliding thrust mechanism 48 in a direction away from the clutch pack. It will be apparent to one skilled in the art that lever arm assembly 46 may be actuated by electromechanical, hydraulic or purely mechanical methods. Moreover, engagement means 22 is contemplated to encompass all reasonably equivalent devices, mechanisms or arrangements known in the clutch art for applying a compressive clutch engagement force on an interleaved clutch pack.

It is common in the art to place friction material on both sides of inner clutch plates 26. However, by placing a layer of friction material 28 on both sides of outer clutch plates 24, rather than on inner separator plates 26, the novel clutch assembly disclosed herein provides additional friction surfaces capable of transferring torque. These additional friction surfaces provide approximately a 10% increase in torque transfer capacity over existing devices. Further, by this arrangement, drum flange 58 and apply plate 60 allow a significant heat sink to input shaft 12.

Figure 2:
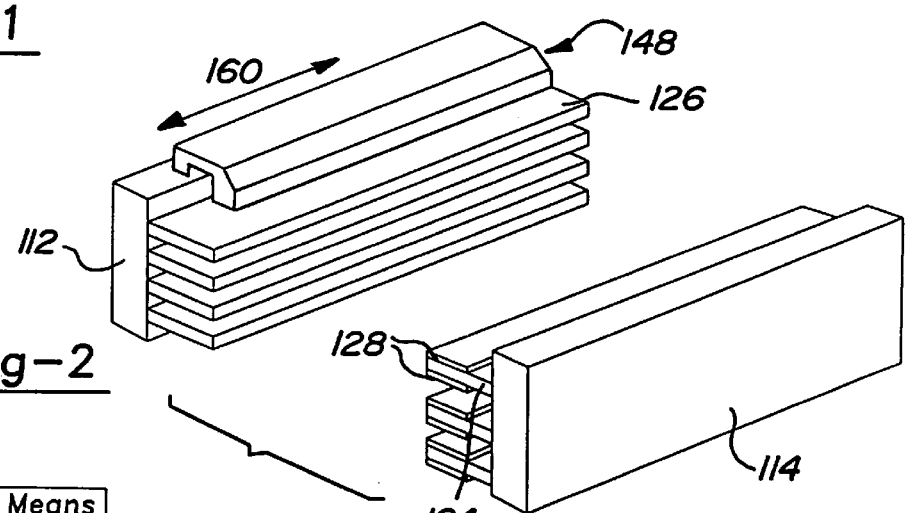
FIG. 2 is an exploded perspective view of a clutch assembly used to transfer linear forces from an input to an output.
Figure 3:
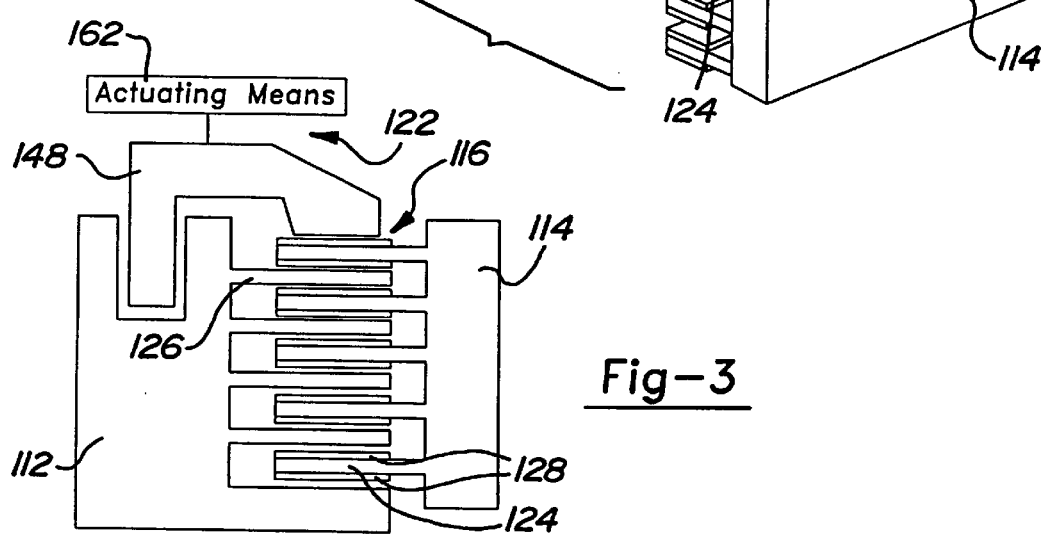
FIG. 3 is a sectional view of a clutch assembly similar to that shown in FIG. 2 illustrating the alternately interleaved engagement of the separator plates and clutch plates and means for actuating the engagement means.

As previously stated, the present invention may be used to transfer forces in other environments including the transmission of linear forces as shown in FIGS. 2 and 3. With reference to FIGS. 2 and 3, an input 112 is shown to include a set of separator plates 126 extending therefrom. Input 112 is adapted to move linearly as shown by arrows 160. An output 114 includes a set of clutch plates 124 each having a layer of a friction material 128 mounted on both sides thereof. Input 112 and output 114 are cooperatively engaged whereby first and second sets of plates 124 and 126 form an interleaved clutch pack 116 (FIG. 3). Engagement means 122 is operative to compress clutch pack 116 and includes a thrust arm or piston 148 connected to actuating means 162. It will be appreciated that placing friction material 128 on both sides of clutch plates 124 when engagement means 122 is coupled for movement with input 112 provides improved torque transfer and heat dissipation.

Various other advantages and modifications will become apparent to one skilled in the art after having the benefit of studying the teachings of the specification, the drawings and the following claims.

What is claimed is:

1. A clutch assembly operative to transmit forces between an input and an output, said clutch assembly comprising;

an input having a hub with a continuous axially extending annular member coupling with a plurality of first plates each having first and second sides;

an output supported for movement relative to said input, said output having a plurality of second plates each with first and second sides, said second plates alternately interleaved with said first plates to form a clutch pack;

said first plurality of plates having a plate thickness about twice that of the plate thickness of said second plurality of plates wherein heat generated between said first and second plurality of plates during operation is dissipated through said first plurality of plates to said continuous annular member of said hub, in turn, to said input;

friction material disposed on said first and second sides of said second plates; and engagement means for applying a compressive force to said clutch pack thereby generating friction forces between said first and second plates that transmit forces between said input and said output, said engagement means coupled to said input for movement with said first plates.

2. The clutch assembly of claim 1 wherein said input includes a rotatably driven member and said output includes a non-driven member supported for rotation relative to said driven member.

3. The clutch assembly of claim 2 wherein said first plates are disks extending radially outward from said driven member and said second plates are disks extending radially inward from said non-driven member.

4. The clutch assembly of claim 2 wherein said non-driven member is disposed concentric about a portion of said driven member and supported by said driven member for rotation relative thereto.

* * * * *